(12) United States Patent
Marsh

(10) Patent No.: US 8,434,371 B2
(45) Date of Patent: May 7, 2013

(54) ELECTROMAGNETIC FLUID VELOCITY SENSOR WITH ADJUSTABLE ELECTRODES

(75) Inventor: Lawrence B. Marsh, Frederick, MD (US)

(73) Assignee: BrickHouse Innovations, LLC, Frederick, MD (US)

( * ) Notice: Subject to any disclaimer, the term of this patent is extended or adjusted under 35 U.S.C. 154(b) by 408 days.

(21) Appl. No.: 12/905,021

(22) Filed: Oct. 14, 2010

(65) Prior Publication Data

US 2012/0090403 A1 Apr. 19, 2012

(51) Int. Cl.
*G01F 1/58* (2006.01)

(52) U.S. Cl.
USPC ..................................... 73/861.12

(58) Field of Classification Search ............ None
See application file for complete search history.

(56) References Cited

U.S. PATENT DOCUMENTS

| | | | |
|---|---|---|---|
| 3,006,188 A | 10/1967 | Handel et al. |
| 3,347,224 A | 10/1967 | Adams |
| 3,707,675 A | 12/1972 | Krechmery et al. |
| 3,722,281 A | 3/1973 | Marsh |
| 3,724,268 A | 4/1973 | Kuwabara |
| 3,734,083 A | 5/1973 | Kolin |
| 3,739,640 A | 6/1973 | Folts |
| 3,802,263 A | 4/1974 | Krechmery et al. |
| 3,827,298 A | 8/1974 | Kawamata et al. |
| 3,842,669 A | 10/1974 | Iversen |
| 3,863,172 A | 1/1975 | Sato et al. |
| 3,878,715 A | 4/1975 | Kobayashi |
| 3,885,433 A | 5/1975 | Marsh |
| 4,000,648 A | 1/1977 | Olson |
| 4,015,471 A | 4/1977 | Marsh |
| 4,083,246 A | 4/1978 | Marsh |
| 4,210,022 A | 7/1980 | Boss |
| 4,236,411 A | 12/1980 | Ketelsen |
| 4,290,312 A | 9/1981 | Kobayashi |
| 4,308,753 A | 1/1982 | Olson |
| 4,322,982 A | 4/1982 | Muller et al. |
| 4,422,337 A | 12/1983 | Hafner |
| 4,459,857 A | 7/1984 | Murray et al. |
| 4,459,858 A | 7/1984 | Marsh |
| 4,549,434 A | 10/1985 | Marsh |
| 4,554,828 A | 11/1985 | Doll |

(Continued)

FOREIGN PATENT DOCUMENTS

| EP | 0233084 B1 | 9/1993 |
|---|---|---|
| JP | 57020613 | 2/1982 |

(Continued)

*Primary Examiner* — Harshad R Patel
(74) *Attorney, Agent, or Firm* — Lawrence E. Laubscher, Sr.; Lawrence E. Laubscher, Jr.

(57) ABSTRACT

An electromagnetic flowmeter includes at least one electromagnet coil arranged outside a liquid flow passage for generating an electromotive force in the liquid flow, and at least one pair of electrodes adjustably extending within the liquid flow for generating a velocity component signal. Preferably, two collinearly arranged coils are provided externally on opposite sides of the liquid flow passage, and a first set of two orthogonally-arranged pairs of coplanar electrodes are mounted on an adjustable probe strut that extends into the liquid flow. For greater accuracy, a Hall-effect device is provided on the probe. Additional sets of electrode pairs may be secured to the strut in planes parallel to the first electrode set. A second pair of collinear coils may be mounted externally of the liquid passage and orthogonally relative to the first coil pair, the two pairs of coils being alternately energized to produce three orthogonally arranged velocity components.

9 Claims, 7 Drawing Sheets

U.S. PATENT DOCUMENTS

| | | |
|---|---|---|
| 4,567,775 A | 2/1986 | Schmoock |
| 4,688,432 A | 8/1987 | Marsh |
| 4,726,236 A | 2/1988 | Wada |
| 4,774,844 A | 10/1988 | Davis |
| 4,920,795 A | 5/1990 | Codazzi et al. |
| 5,220,841 A | 6/1993 | Brown et al. |
| 5,237,872 A | 8/1993 | Rademakers |
| 5,263,374 A | 11/1993 | Marsh |
| 5,275,059 A | 1/1994 | Lew et al. |
| 5,313,842 A | 5/1994 | Marsh |
| 5,337,607 A | 8/1994 | Brown |
| 5,369,999 A | 12/1994 | Yoshida |
| 5,385,056 A | 1/1995 | Marsh |
| 5,390,548 A | 2/1995 | Kasper et al. |
| 5,398,471 A | 3/1995 | Spagnolo |
| 5,417,118 A | 5/1995 | Lew et al. |
| 5,448,920 A | 9/1995 | Ketelsen et al. |
| 5,503,027 A | 4/1996 | Hemp |
| 5,551,306 A | 9/1996 | Scarpa |
| 5,594,179 A | 1/1997 | Marsh |
| 5,684,250 A | 11/1997 | Marsh |
| 5,811,688 A | 9/1998 | Marsh |
| 5,866,823 A | 2/1999 | Scarpa |
| 5,895,864 A | 4/1999 | Wang et al. |
| 6,435,036 B1 | 8/2002 | Sakai et al. |
| 6,598,487 B1 | 7/2003 | Marsh |
| 6,763,729 B1 | 7/2004 | Matzen |
| 6,922,059 B2 | 7/2005 | Zank et al. |
| 7,117,750 B2 | 10/2006 | Brockhaus et al. |
| 7,194,918 B2 | 3/2007 | Brockhaus et al. |
| 7,287,435 B2 | 10/2007 | Ketelsen |
| 7,404,335 B2 | 7/2008 | Conrady et al. |
| 7,574,924 B1 | 8/2009 | Feller |
| 7,587,947 B1 | 9/2009 | Feller |
| 2002/0050175 A1 | 5/2002 | Feller |
| 2003/0213310 A1 | 11/2003 | Brockhaus |
| 2004/0169501 A1 | 9/2004 | Munson |
| 2005/0109120 A1 | 5/2005 | Turner |
| 2006/0272427 A1 | 12/2006 | Zingg |
| 2009/0260452 A1 | 10/2009 | Rasmussen |

FOREIGN PATENT DOCUMENTS

| | | |
|---|---|---|
| JP | 57023477 | 2/1982 |
| JP | 58071416 | 4/1983 |
| JP | 62192665 | 12/1987 |
| JP | 2001183193 | 7/2001 |

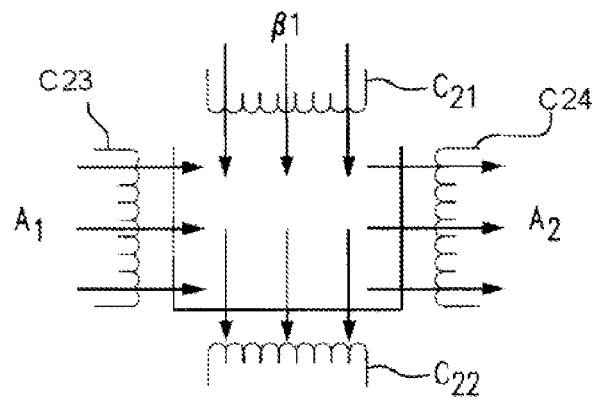
FIG. 15
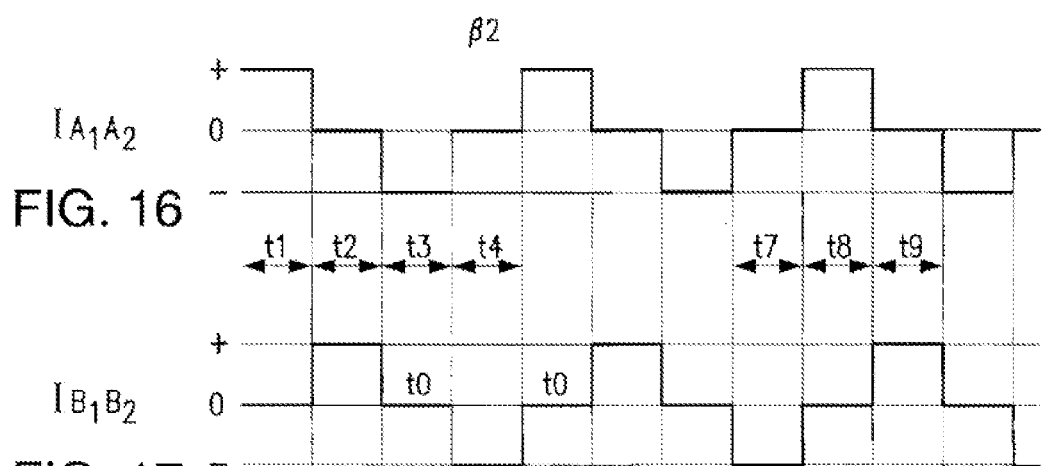
FIG. 16
FIG. 17
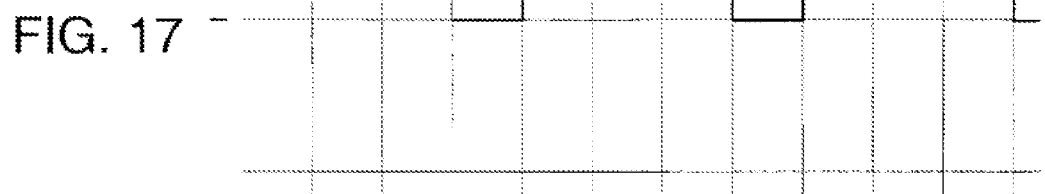
FIG. 18
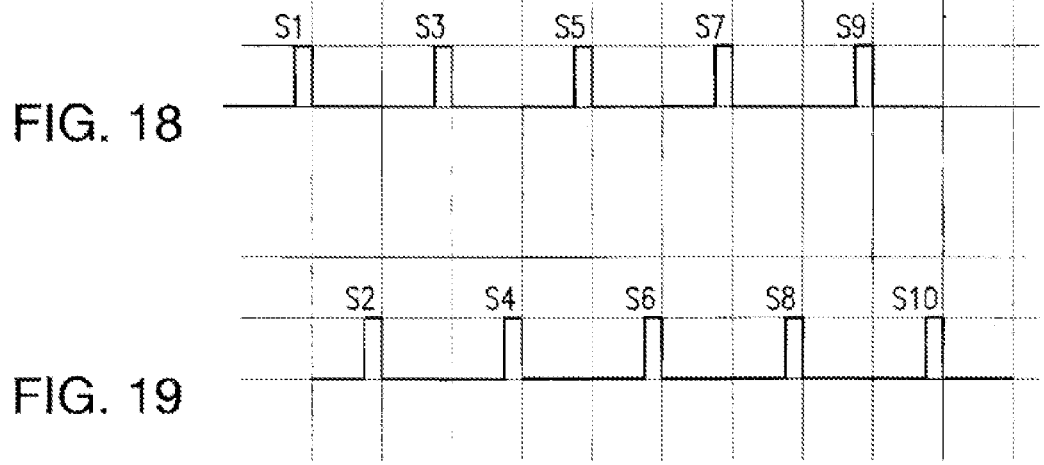
FIG. 19

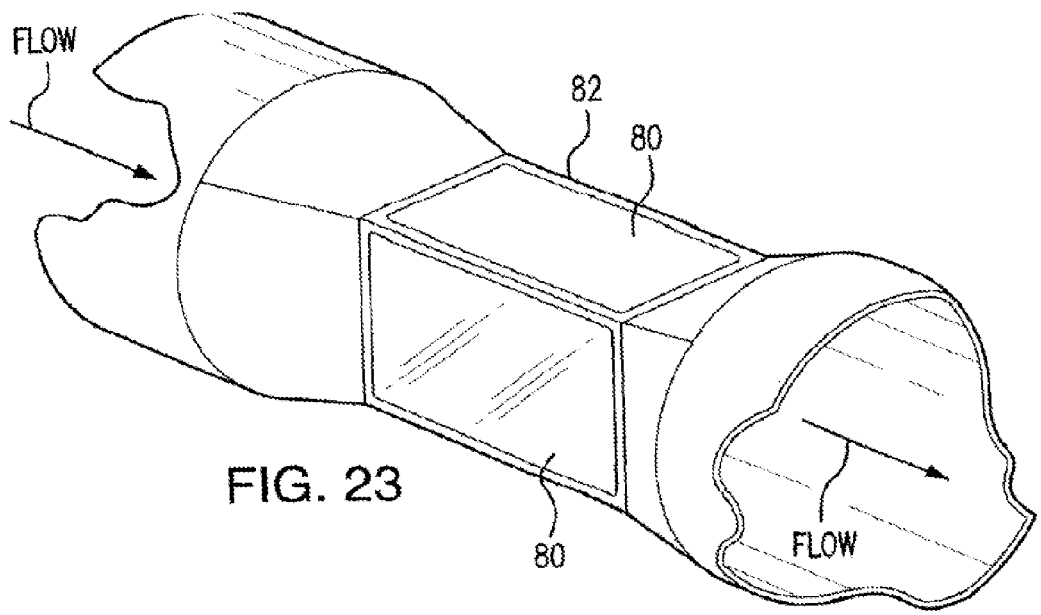
FIG. 23
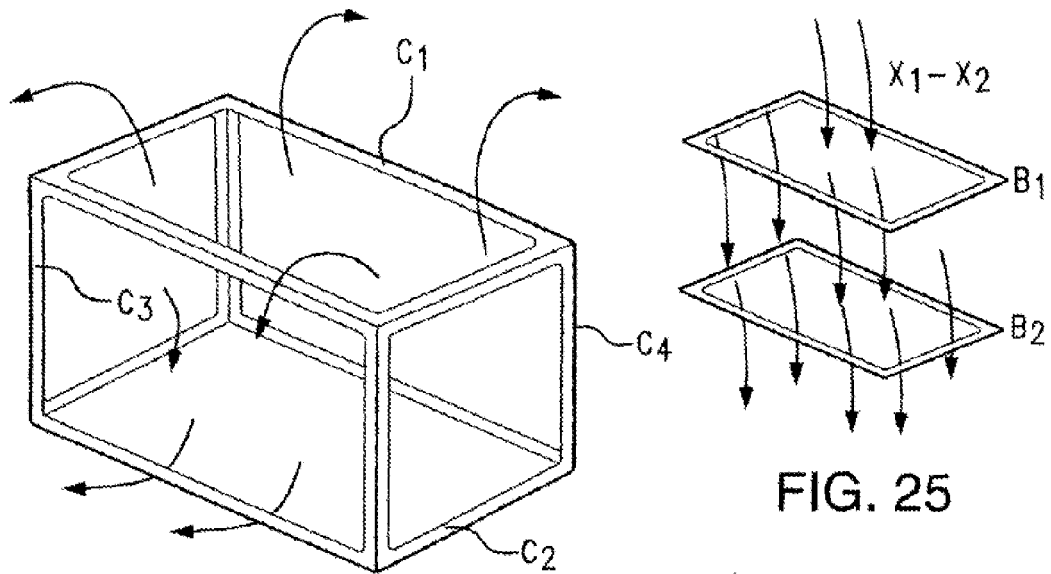
FIG. 24
FIG. 25
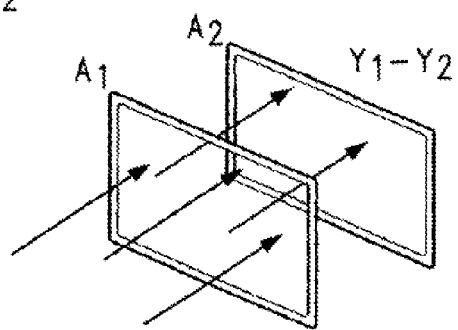
FIG. 26

ELECTROMAGNETIC FLUID VELOCITY SENSOR WITH ADJUSTABLE ELECTRODES

BACKGROUND OF THE INVENTION

1. Field of the Invention

An electromagnetic flowmeter includes at least one electromagnetic coil arranged outside a liquid flow passage for generating an electromotive force in the liquid flow, and at least one pair of electrodes adjustably extending into the liquid flow for generating a velocity component signal. Preferably, two collinearly arranged coils are provided externally on opposite sides of the liquid passage, and a first set of two orthogonally-arranged pairs of coplanar electrodes are mounted on an adjustable probe strut that extends into the liquid flow. For greater accuracy, a Hall-effect device may be provided on the probe. Additional sets of electrode pairs may be secured to the strut in planes parallel to the first electrode set. Three orthogonally-arranged velocity components are achieved by using a second pair of collinear coils mounted externally of the liquid passage in orthogonally displaced relation relative to the first pair of coils.

2. Description of Related Art

The Faraday Law of electromagnetic induction has been applied to water flow measuring devices for nearly 100 years. As early as 1910, a device for measuring the speed of a moving vessel was patented. Since then, a multitude of other applications and devices utilizing the Faraday Law have followed. Devices were made for measuring the volumetric flow in both open channels and full pipes where the magnetic field was applied to a large portion of the flow cross section and the induced electromotive force (emf) was averaged over an equally large portion of the cross section. Additionally, probe type velocity sensors were invented where the magnetic field was localized to a small area (generally the size of the probe) and the sensing electrodes were attached to the surface of the probe allowing for the measurement of water velocities in the vicinity of the probe.

As described in the following patents, the construction of probe type velocity sensors were focused on trying to make the best velocity measurement while keeping the magnet and electrode assembly from adversely affecting the flow around the sensor thereby affecting the velocity measurement. The Olson U.S. Pat. No. 3,693,440 describes 'an "open" cage-like housing for the magnetic field coils and electrodes that practically eliminates any physical interference with the water flow. Additional patents, such as Cushing U.S. Pat. No. 4,089,218, Marsh U.S. Pat. Nos. 4,459,858 and 4,688,432, all describe various probe type electromagnetic sensors. In all of the prior art, the electrodes and the magnetic coils were rigidly fixed in relationship to each other. Even in the Marsh U.S. Pat. Nos. 5,398,552 and 6,598,487, where the magnet assembly and the electrode assembly were separable, the magnet and electrodes were secured at a known relationship to each other when placed together for the flow measurement.

The present invention described herein differs from the prior art in that the electrodes are separate from the magnetic coil assembly, and the magnetic coil assembly is placed at some distance from the electrodes, preferably out of the path of the flowing water.

SUMMARY OF THE INVENTION

Accordingly, a primary object of the present invention is to provide an electromagnetic flowmeter including at least one electromagnet coil arranged outside a liquid flow passage for generating an electromotive force in the liquid flow, and at least one pair of electrodes adjustably extending into the liquid flow for generating a velocity component signal. The liquid flow passage may comprise either an open-topped channel or a closed conduit.

According to a more specific object of the invention, two collinearly arranged coils are provided externally on opposite sides of the liquid passage, and a first set of two orthogonally-arranged pairs of coplanar electrodes are mounted on an adjustable probe strut that extends into the liquid flow. For greater accuracy, a Hall-effect device may be provided on the probe. Additional sets of electrode pairs may be secured to the strut in planes parallel to the first electrode set.

In a further embodiment of the invention, three orthogonally-arranged velocity components are achieved by using a second pair of collinear coils mounted externally of the liquid passage in orthogonally displaced relation relative to the first pair of coils. These three components are combined to provide an accurate velocity measurement of the liquid flowing in the passage.

BRIEF DESCRIPTION OF THE DRAWINGS

Other object and advantages of the invention will become apparent from a study of the following specification, when viewed in the light of the accompanying drawings, in which:

FIG. 15 is a schematic representation of the orthogonal arrangement of two pair coils relative to an open topped channel;

FIGS. 16 and 17 are timing curves illustrating the alternate energization of the coil pairs of FIG. 15;

FIGS. 18 and 19 are sampling curves illustrating the sampling signals taken from the timing curves 16 and 17, respectively;

FIG. 23 is a perspective view illustrating one laboratory environment in which the invention has utility; and FIGS. 24-26 are schematic illustrations of the operation of the invention in a laboratory environment.

DETAILED DESCRIPTION OF THE INVENTION

Figure 1:
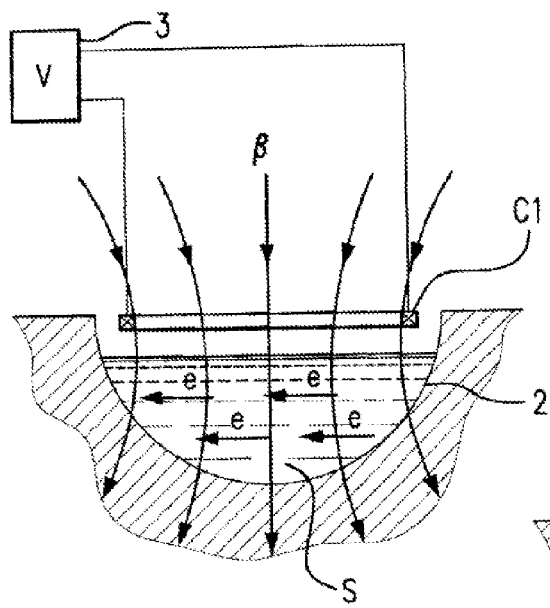
FIG. 1 is schematic representation of the use of a single coil for generating an electromotive force in a liquid flowing in an open-topped channel, and FIGS. 2-4 illustrated various arrangements of a pair of electrodes relative to the liquid flow of FIG. 1.
Figure 2:
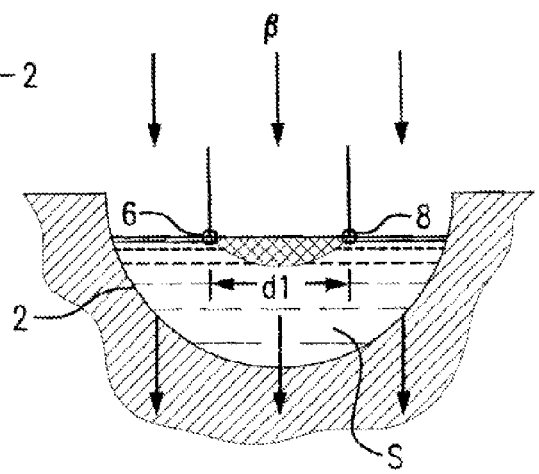
Figure 3:
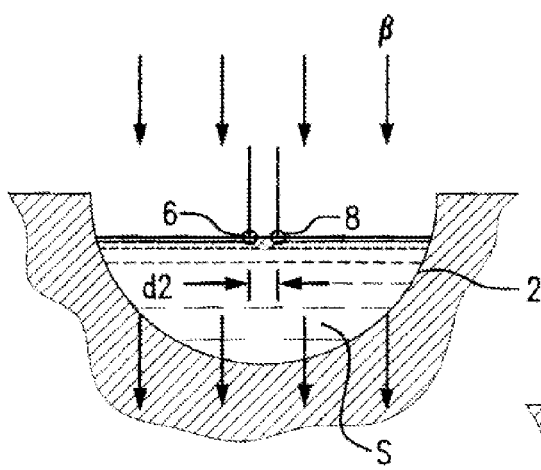
Figure 4:
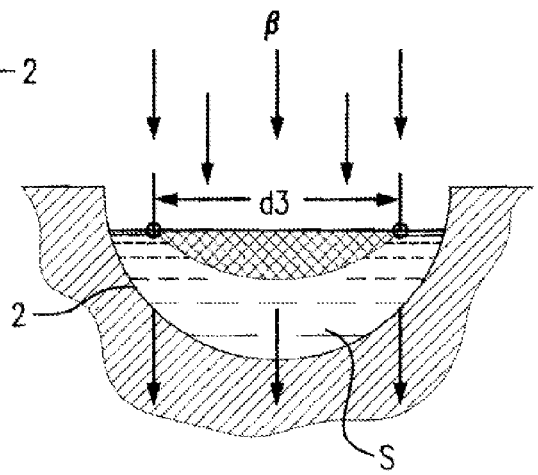

Referring first more particularly to FIG. 1, it will be seen that a magnetic field β is generated by an electromagnetic coil $C_1$ placed above an open-topped channel 2 having a transversely curved bottom wall, which coil is supplied with electrical energy from voltage source 3. The fluid volume that is energized by this coil will have an electromotive force e throughout this volume that is a product of the magnetic field strength and the velocity of the flowing water. In FIG. 2, a pair of detection electrodes 6 and 8 are provided that are separated by the distance dl. The voltage detected by this separation is determined largely by the electromotive forces contained in the shaded area. FIG. 3 shows a similar configuration, but the distance d2 between the electrodes is less, and the volume of measurement is less. FIG. 4 shows a similar configuration, but with a greater separation distance d3. Here, the measured volume is greater. In addition to the measured volumes being defined by the distance between the detection electrodes, the magnitude of the signal typically increases with electrode separation since the individual electromotive forces add together when all of the flow is in the same direction.

Figure 5:
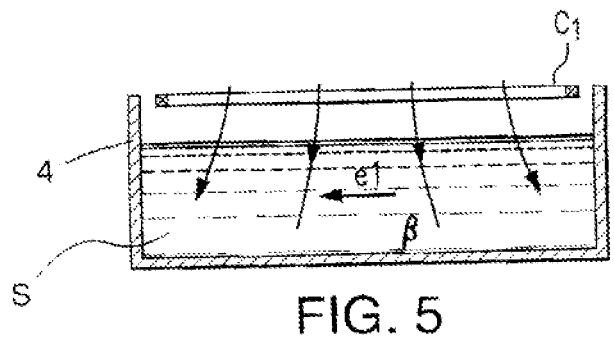
FIG. 5 is a schematic representation of the flux pattern produced in the liquid flow in an open-topped channel by a single coil arranged above the liquid flow.

Referring now to FIG. 5, the first coil $C_1$ is placed above the liquid stream S in an open-topped channel 4, and electrical current passing through this coil generates a magnetic field β that extends both upwardly and downwardly. The downward portion of the field extends into the liquid stream S flowing in the open-topped channel 4. The interaction of the magnetic field and the flowing stream causes an electromotive force (emf) e1 to be established throughout the energized portion of the flow channel. A shortcoming of using only a single coil is that the magnetic flux lines β do not remain normal to the direction of the flow, but are more curved.

Figure 6:
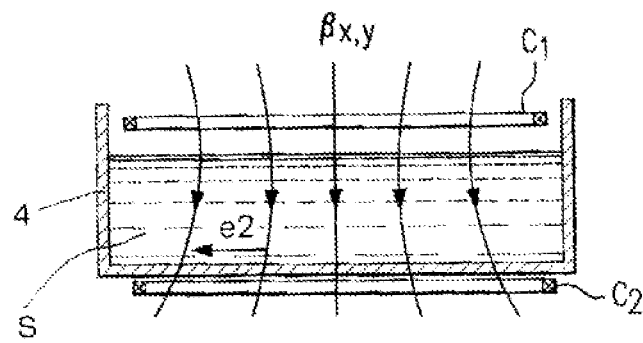
FIG. 6 shows the flux pattern when a pair of coils are arranged collinearly above and below the channel.

In the embodiment of FIG. 6, in addition to the first coil $C_1$ placed above the flow, a second coil $C_2$ is placed below the flow. The use of a second coil significantly corrects the shortcoming of a single coil in that the field direction between the two coils is substantially perpendicular to the flow channel. Electrical current passing through the two coils generates an additive vertical magnetic field $β_{x,y}$ that extends both upwardly and downwardly. The downward portion of the field extends into the flowing stream to produce a transverse electromotive force e2 throughout the energized portion of the flow channel.

Figure 7:
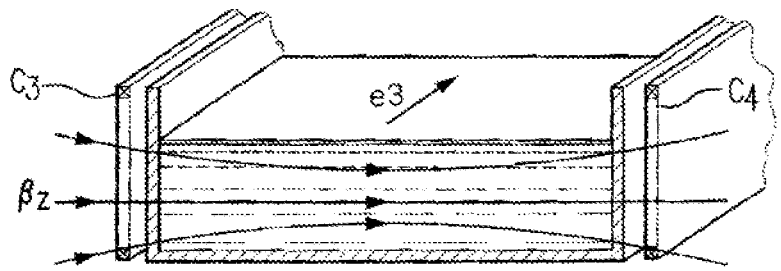
FIG. 7 illustrates the flux pattern produced by a pair of coils arranged collinearly on opposite sides of the channel

In the modification of FIG. 7, a pair of collinear coils $C_3$ and $C_4$ are arranged horizontally externally of the passage 4 to measure the vertical component of flow. In this configuration, the additive magnetic field $β_z$ created by coils $C_3$ and $C_4$ is generally horizontal and parallel to the bottom of the flow channel, and normal to vertical axis. The interaction of the magnetic field and any vertical flow causes a horizontal emf e3, to be established throughout the energized portion of the flow channel. The horizontal direction of this emf is parallel to the channel bottom and aligned longitudinally in an "upstream/downstream" direction of fluid flow.

Figure 8:
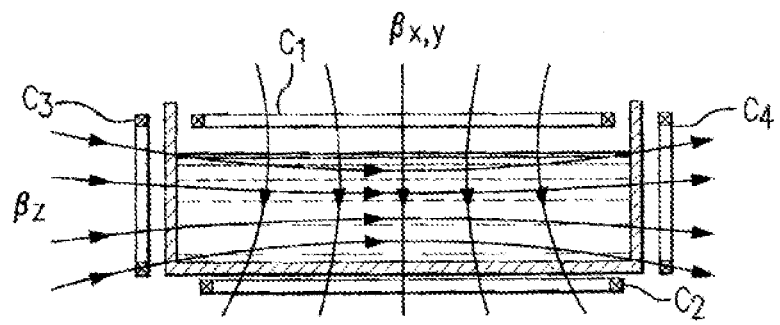
FIG. 8 illustrates the flux paths produced by an alternately energized combination of the coil arrangements of FIGS. 6 and 7.

Referring now to FIG. 8, a combination of the coil arrangements of FIGS. 6 and 7 is shown. By alternately first energizing the coil pair $C_1$ and $C_2$ to produce a vertical field $β_{x,y}$, and then subsequently energizing coils $C_3$ and $C_4$ to produce the horizontal field $β_z$, the energized volume is capable of measuring all three components of the flow velocity vector. The timing means of achieving is described in greater detail below with reference to FIGS. 15-22.

Figure 9:
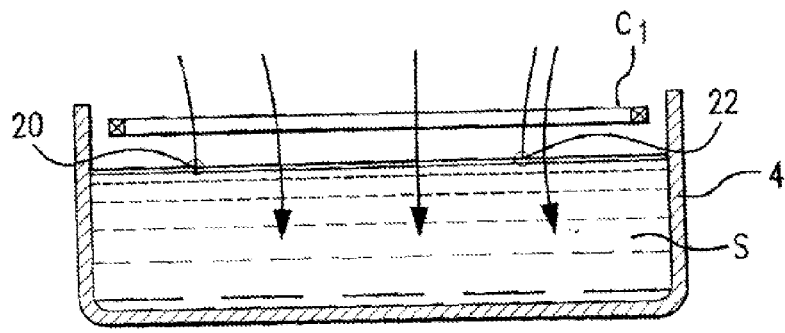
FIG. 9 illustrates a possible electrode arrangement for the single coil arrangement of FIG. 5, and FIGS. 10 and 11, illustrate electrode arrangements on a probe introduced into the liquid flows of the arrangements of FIGS. 6 and 7, respectively.
Figure 10:
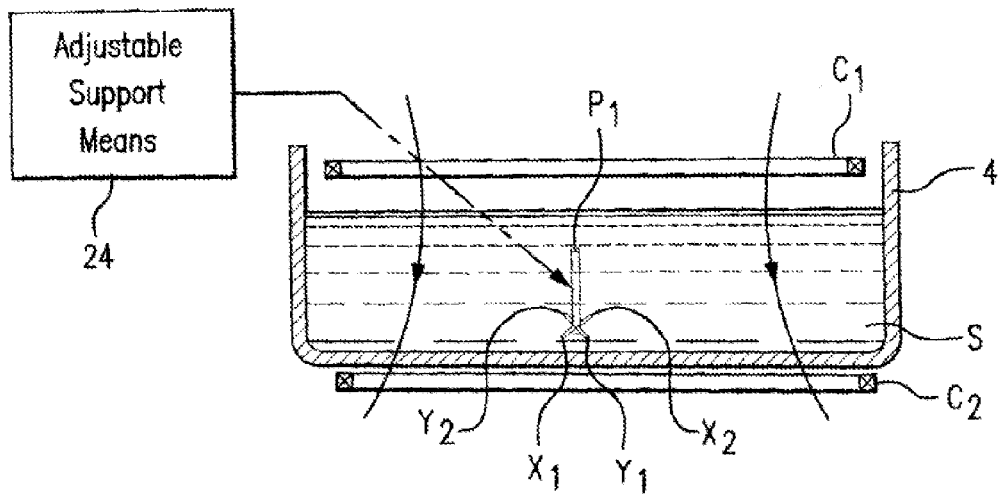

Referring now to the embodiment of FIG. 9, a single magnet coil $C_1$ is placed above the flow in an open channel 4 with the electrodes 20 and 22 either just touching the top surface of the flowing fluid or lowered to other locations within the flow. In FIG. 10, two coils are provided, a first one $C_1$ being arranged above the water surface, and a second coil $C_2$ being arranged below the channel bottom wall. Two pairs of orthogonally arranged electrodes X1, X2 and Y1, Y2 contained in a common horizontal plane are placed at the lower end of a small probe P1 that is adjustably suspended by position adjusting means 24 from above into the flow. In this configuration both the "X" and "Y" horizontal components of the flow velocity can be obtained. The velocity at any point throughout the hydraulic model can be measured by simply placing the sensor in the desired location. Note that the obstruction to flow caused by the electrode structure is very minimal as compared to what it would be if the magnet were part of the probe itself Additionally, different probe tips could be used to vary the volume size that the electrodes detect. The greater the electrodes are separated from each other, the greater the spatial volume where the velocity is being measured.

Figure 11:
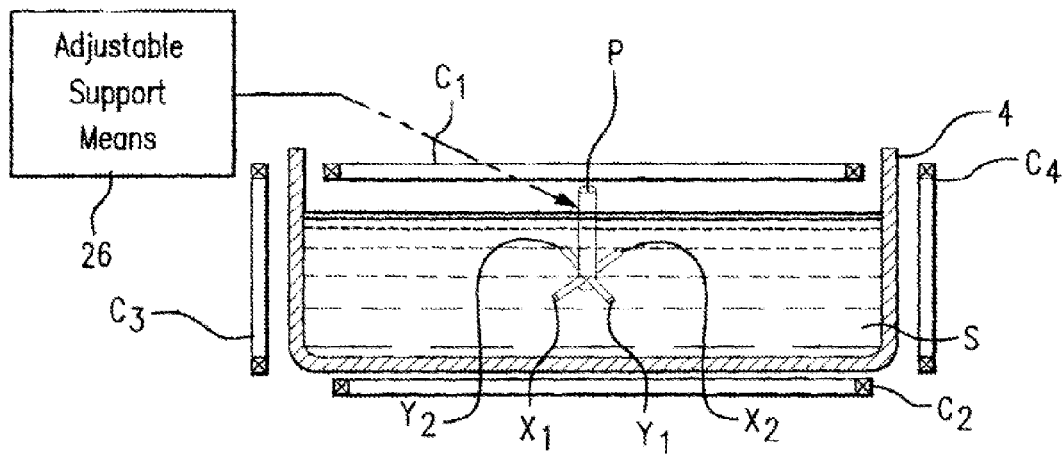

FIG. 11 shows an arrangement where all three components of the velocity vector can be measured. In this arrangement, the magnetic field is periodically alternately switched from being in a vertical orientation to one of being in the horizontal orientation, use being made of two pairs of coils $C_1$, $C_2$, and $C_3$, $C_4$ having axes that are orthogonally arranged relative to each other. The probe P is suspended as before by the position adjusting means 26.

To detect the electromotive forces (emfs) generated by the local velocities in the presence of the magnetic field, various configurations of electrodes can provide the user with a means of measuring one, two and three axes of local velocities throughout the energized volume as well as being able to sum these velocities over a larger volume.

Figures 12, 13, 14:
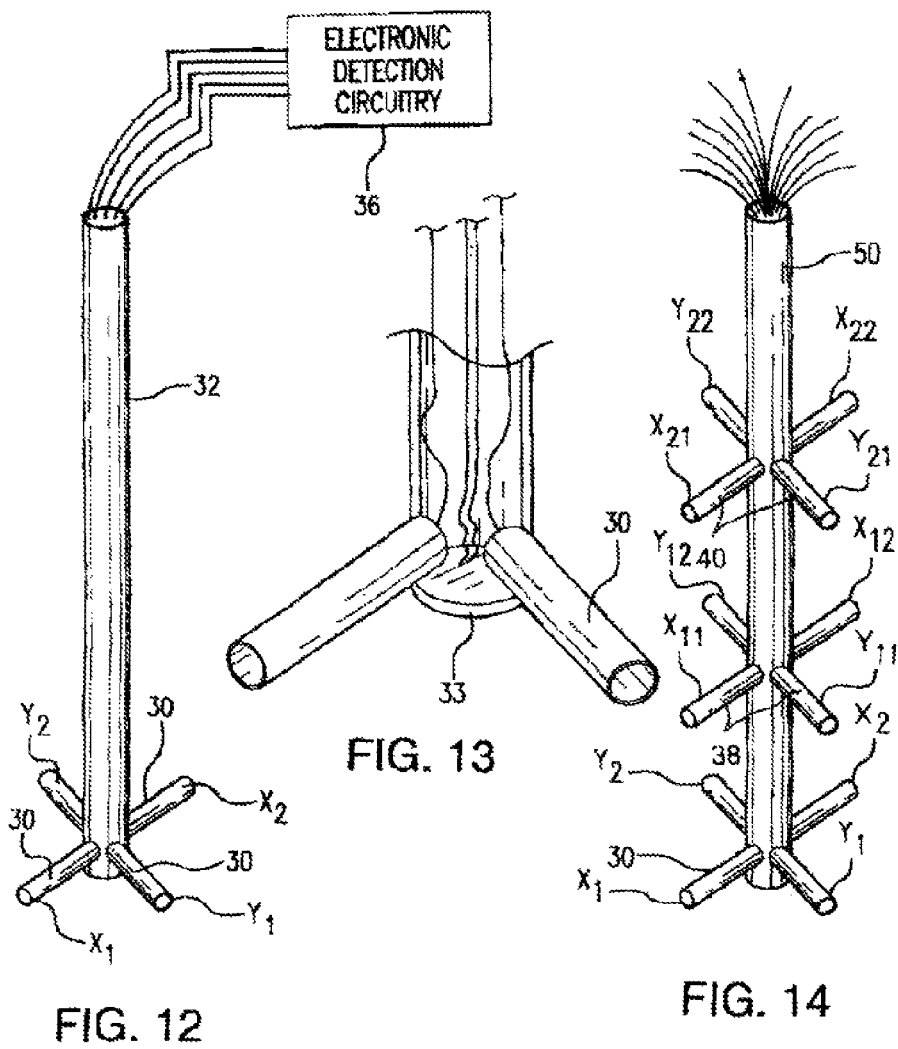
FIG. 12 is a perspective diagrammatic illustration of a first probe arrangement in accordance with the present invention.
FIG. 13 illustrates a first modification of the probe arrangement of FIG. 12 including a Hall effect sensor.
FIG. 14 is a second embodiment of the probe arrangement of FIG. 12.
Figure 20:
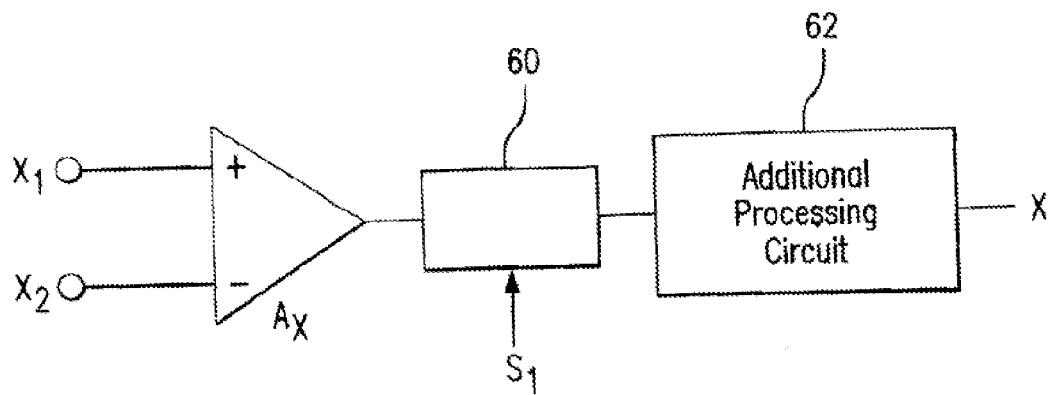
FIGS. 20-22 are schematic diagrams of the processing of the signals of FIGS. 16-19 to produce the three orthogonally-arranged velocity output signals.
Figure 21:
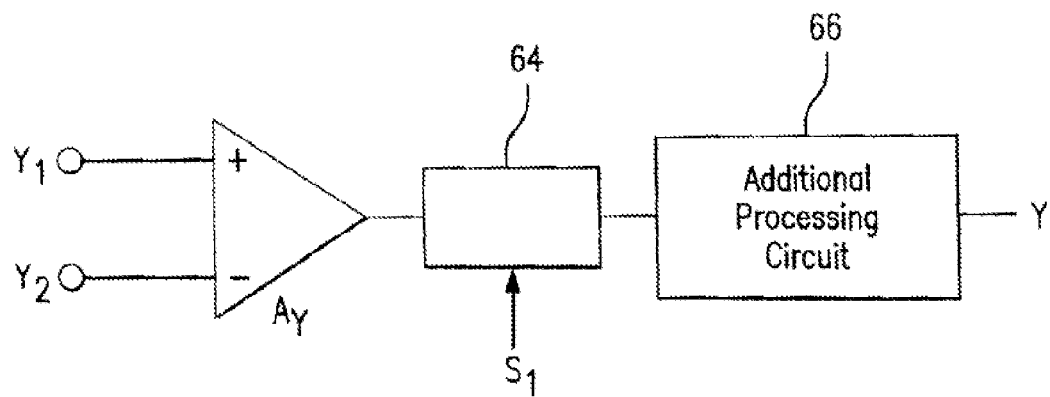
Figure 22:
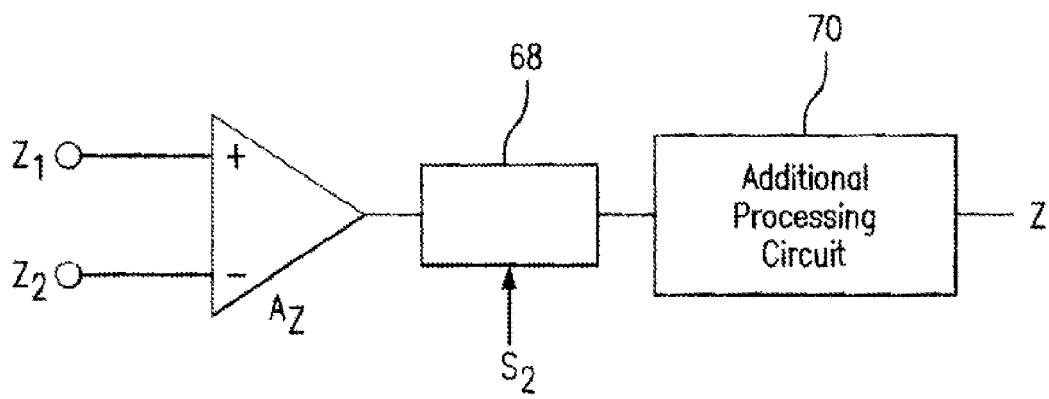

In FIG. 12, a sensor probe structure is illustrated that provides for the measurement of the X and Y horizontal components of a velocity vector. Two orthogonally arranged electrode pairs, $X_1$, $X_2$, and $Y_1$, $Y_2$, contained in a common horizontal plane are placed at the ends of four tubular arms 30 that extend radially-outwardly from the lower end of a vertical tubular mounting strut 32. Preferably, the Y axis of the electrode arrangement extends longitudinally parallel with the direction of fluid flow. The tubular arms and the mounting strut are formed from a suitable electrically insulating synthetic plastic material. Attached to each electrode is a conductor that extends upwardly within the probe body so as to emerge at the top of the mounting strut. These signal wires are attached to the electronic detection means 36. The probe is placed within the magnetically energized volume in such a position that the four electrodes are contained adjacent the horizontal plane of the velocity components. This plane will also be normal to the direction of the additive magnetic field produced by the coils C1 and C2.

The magnitude of the signal present at the electrodes is directly proportional to the speed of the water and the strength of the magnetic field. Although the magnetic field strength is relatively uniform throughout the volume between any two coils, the variations may be such that desired accuracy of measurement cannot be achieved. To achieve higher accuracy, a small magnetic field detector 33 can be incorporated within the sensor as shown in FIG. 13. Typically such a sensor would be a "Hall Effect" device. The strength of the magnetic field is then used to better calibrate the instrument.

In the sensor probe of FIG. 14, the measurement of multiple points of the x and y components of a velocity vector is achieved through the use of a stacked multiple electrode array. The first set of coplanar electrode pairs, $X_1$ and $X_2$, and $Y_1$ and $Y_2$, are respectively placed at the ends of the radially-outwardly extending arms 30 of an X-shaped probe, and directly above those pairs are arranged a second set of coplanar electrode pairs, $X_{11}$ and $X_{12}$, and $Y_{11}$ and $Y_{12}$ respectively supported by the radial arms 38. Similarly, above those pairs are arranged a third set of coplanar electrode pairs, $X_{21}$ and $X_{22}$, and $Y_{21}$ and $Y_{22}$ supported by radial arms 40. Attached to each electrode is a signal wire that is placed within the probe body so as to emerge at the top of the tubular mounting strut 50. These signal wires are attached to the electronic signal detection means 36. The probe is placed within the magnetically energized volume of fluid flow in such a position that the X-shaped sensor electrodes are contained in the same vertically spaced horizontal planes as the velocity vector components, respectively. These planes will also be normal to the direction of the magnetic field.

FIGS. 15-19 illustrate the timing circuitry for achieving 3-axis sensor operation. In FIG. 15, two pairs of coils $C_{21}$, $C_{22}$ and $C_{23}$, $C_{24}$ are alternately energized to create magnetic fields that are orthogonal to each other. The coil pair $C_{23}$, $C_{24}$ is energized as shown in FIG. 16, and the coil pair $C_{21}$ and $C_{22}$ is energized as shown in FIG. 17. During time period $t_1$, the current is passed through the coils $C_{22}$ and $C_{23}$ to cause the magnetic field to be directed from left to right in FIG. 15. During this same period, the coils $C_{21}$ and $C_{22}$ are not energized. During the next period, $t_2$, the magnetic field of coils $C_{23}$ and $C_{24}$ is zero, and the magnetic field of coils $C_{21}$ and $C_{22}$ is directed vertically from top to bottom (FIG. 15). During time period $t_3$, the current is passed through the coils $C_{23}$ and $C_{24}$ to cause the magnetic field to be directed from right to left in FIG. 15. During this same period, the coils $C_{21}$ and $C_{22}$ are not energized. During the next period, $t_4$, the magnetic field of coils $C_{23}$ and $C_{24}$ is zero, and the magnetic field of coils $C_{21}$ and $C_{22}$ is directed vertically from bottom to top. This sequence continues as shown by FIGS. 16 and 17.

Concurrent with the illustrated magnetic drive sequence, there are additional waveforms that are synchronized to these magnetic drivers. Shown in FIG. 18 is the data sampling pulse for obtaining flow data when coils $C_{23}$ and $C_{24}$ are energized, and FIG. 19 illustrates the data sampling pulse for obtaining flow data when coils $C_{21}$ and $C_{22}$ are energized. These data sampling pulses are used in conjunction with the flow signal electronic circuitry shown in FIGS. 20-22. The electromagnetic forces present between electrodes $X_1$ and $X_2$ are presented to differential amplifier Ax, sampled by the sampling signal $S_1$ applied to signal modifying means 60, and then processed by signal processing means 62 to produce the first horizontal flow velocity component X. In a similar manner, the electromotive forces present between electrodes $Y_1$, $Y_2$ are presented to differential amplifier Ay for modification by the sampling signal S1 applied to signal modifying means 64 and processing circuit 66 to produce the second horizontal flow velocity component Y. Finally, the electromotive forces between the electrodes $Z_1$, $Z_2$ are sampled by the sampling signal S2 applied to the signal modifying means 68 and processing circuit 70 to produce the vertical flow velocity component Z.

FIG. 23 illustrates a typical hydraulic laboratory flume, wherein water is circulated in a closed loop and is observed through transparent windows 80 contained in a rectangular section of conduit 82. In this particular application, two sets of coils A1, A2 and B1, B2 (FIGS. 24-26) are placed in the corners of the flume so as to energize the volume contained between the windows with a switched field that will allow for a three-dimensional detection of the velocities within the fluid stream. Substantially unobstructed probes such as those shown in FIGS. 12-14 could be used to measure the desired velocities by moving the probe(s) anywhere within the energized volume.

The present invention has been described in connection with an open-topped channel passage for the liquid flow; however, it is apparent that the passage could be a closed conduit as well.

While in accordance with the provisions of the patent Statutes the preferred forms and embodiments of the invention have been illustrated and described, it will be apparent to those skilled in the art that changes may be made without deviating from the invention described above.

What is claimed is:

1. An electromagnetic flowmeter for measuring the velocity of fluid in a passage, comprising:
    (a) a passage including a conduit or an open-topped channel for conveying the fluid flow in a given generally horizontal direction;
    (b) an electromagnetic coil arrangement arranged externally of said passage for generating a first magnet field within the fluid in a direction generally normal to the direction of the fluid flow;
    (c) an electrode arrangement including a first pair of electrodes spaced along a given axis;
    (d) an adjustable support supporting said first pair of electrodes within the fluid flow for simultaneous adjustment independently of said electromagnetic coil arrangement; and
    (e) a signal detection device connected with said first pair of electrodes for generating a signal that is a function of the velocity of the fluid flow in said passage.

2. Apparatus as defined in claim 1, wherein said electromagnetic coil arrangement comprises a first electromagnetic coil ($C_1$) arranged externally of said passage means.

3. Apparatus as defined in claim 2, wherein said electromagnetic coil arrangement further includes a second electromagnetic coil ($C_2$) arranged collinearly on the opposite side of said passage from said first electromagnetic coil, said first and second electromagnetic coils being simultaneously energized and having the same polarity.

4. Apparatus as defined in claim 3, wherein said adjustable electrode support supports said first pair of spaced electrodes ($X_1$, $X_2$) such that the axis thereof is generally normal to said first magnetic field and normal to said direction of fluid flow.

5. Apparatus as defined in claim 4, wherein said electrode arrangement includes a second pair of spaced electrodes ($Y_1$, $Y_2$) arranged in a horizontal plane containing said first pair of electrodes, said second pair of electrodes defining an axis displaced 180 degrees from the axis of said first pair of electrodes.

6. Apparatus as defined in claim 5, wherein said first and second electromagnetic coils are horizontally and externally arranged above and below said passage; and further wherein said adjustable electrode support comprises a probe (P) including:
    (1) a vertical support strut (32); and
    (2) a first set of four orthogonally arranged horizontal support arms (30) contained in a horizontal plane and extending radially outwardly from said support strut, said pairs of electrodes ($X_1$, $X_2$, $Y_1$, $Y_2$) being supported by the free ends of said first set of support arms, respectively.

7. Apparatus as defined in claim 6, and further including means for sensing the strength of said first magnetic field, including a horizontal Hall-effect device (33) connected with said support strut.

8. Apparatus as defined in claim 6, wherein said adjustable electrode support further includes:
- (3) at least one second set of horizontal support arms (38, 40) extending radially outwardly from said vertical support strut in a horizontal plane vertically spaced from the plane of said first set of support arms;
- and further wherein said electrode arrangement includes a second set of electrode pairs ($X_{11}, X_{12}, Y_{11}, Y_{12}$ and $X_{21}, X_{22}; Y_{21}, Y_{22}$) connected with the ends of said at least one second set of support arms, respectively.

9. Apparatus as defined in claim 6, and further including:
- (f) an additional pair of coils ($C_3, C_4$) arranged vertically on opposite sides of said passage for generating a second magnetic field normal both to the direction of the first magnetic field and to said direction of fluid flow; and
- (g) means for alternately energizing said first and second magnetic fields;
- (h) said signal detection device including a circuit arrangement for processing the signals generated by said first and second set of electrode pairs to produce three mutually-orthogonal velocity components ($V_x, V_y, V_z$).

* * * * *